(12) United States Patent
Yamamoto et al.

(10) Patent No.: US 8,465,861 B2
(45) Date of Patent: Jun. 18, 2013

(54) BATTERY PACK AND METHOD FOR PRODUCING THE SAME

(75) Inventors: Takeru Yamamoto, Fukushima (JP);
Ken Segawa, Fukushima (JP);
Shunsuke Saito, Fukushima (JP)

(73) Assignee: Sony Corporation, Tokyo (JP)

( * ) Notice: Subject to any disclaimer, the term of this patent is extended or adjusted under 35 U.S.C. 154(b) by 1197 days.

(21) Appl. No.: 12/330,596

(22) Filed: Dec. 9, 2008

(65) Prior Publication Data

US 2009/0191448 A1     Jul. 30, 2009

(30) Foreign Application Priority Data

Jan. 30, 2008   (JP) .................................. 2008-19612

(51) Int. Cl.
*H01M 4/78* (2006.01)

(52) U.S. Cl.
USPC ............................................ 429/94; 429/175

(58) Field of Classification Search
USPC ...................................... 429/94, 175; 264/261
See application file for complete search history.

(56) References Cited

U.S. PATENT DOCUMENTS

| | | | |
|---|---|---|---|
| 3,205,120 A * | 9/1965 | Flanders ....................... | 442/150 |
| 6,335,417 B1 * | 1/2002 | Orikabe et al. ................ | 528/170 |
| 6,881,371 B2 | 4/2005 | Iwaizono et al. | |
| 7,285,334 B1 * | 10/2007 | Yamashita et al. ............ | 428/458 |
| 2003/0003357 A1 | 1/2003 | Tamai et al. | |
| 2009/0274846 A1 * | 11/2009 | Wada et al. ................. | 427/407.1 |
| 2010/0184878 A1 * | 7/2010 | Abraham et al. ............. | 521/156 |
| 2012/0141871 A1 * | 6/2012 | Inagaki et al. ................ | 429/211 |

FOREIGN PATENT DOCUMENTS

| | | |
|---|---|---|
| JP | HEI 09-324027 | 12/1997 |
| JP | 2000-226426 | 8/2000 |
| JP | 2001-270927 | 10/2001 |
| JP | 2003-246834 | 9/2003 |
| JP | 2004-152655 | 5/2004 |
| JP | 3614767 | 5/2004 |
| JP | 3643792 | 11/2004 |
| JP | 2007-031726 | 2/2007 |
| JP | 2007-119786 | 5/2007 |
| JP | 2007-119787 | 5/2007 |
| JP | 2007-323907 | 12/2007 |
| JP | 3556875 | 1/2009 |

OTHER PUBLICATIONS

Japanese Office Action issued on Dec. 22, 2009, for corresponding Japanese Patent Application 2008-019612.
Japanese Office Action issued Oct. 26, 2010, for corresponding Japanese Appln. No. 2008-019612.
Japanese Office Action issued Mar. 13, 2012, for corresponding Japanese Appln. No. 2008-019612.

* cited by examiner

*Primary Examiner* — Mark F Huff
*Assistant Examiner* — Monique Wills
(74) *Attorney, Agent, or Firm* — K&L Gates LLP

(57) ABSTRACT

A battery pack includes: a battery including a battery element covered with a packaging member, the battery element including a positive electrode and a negative electrode which are spirally wound together or stacked on one another through a separator; a protection circuit board for the battery; and a covering material collectively covering the battery and the protection circuit board. The covering material includes a shape-retaining polymer. The shape-retaining polymer contains an insulating curable polyurethane resin including polyol and polyisocyanate.

19 Claims, 5 Drawing Sheets

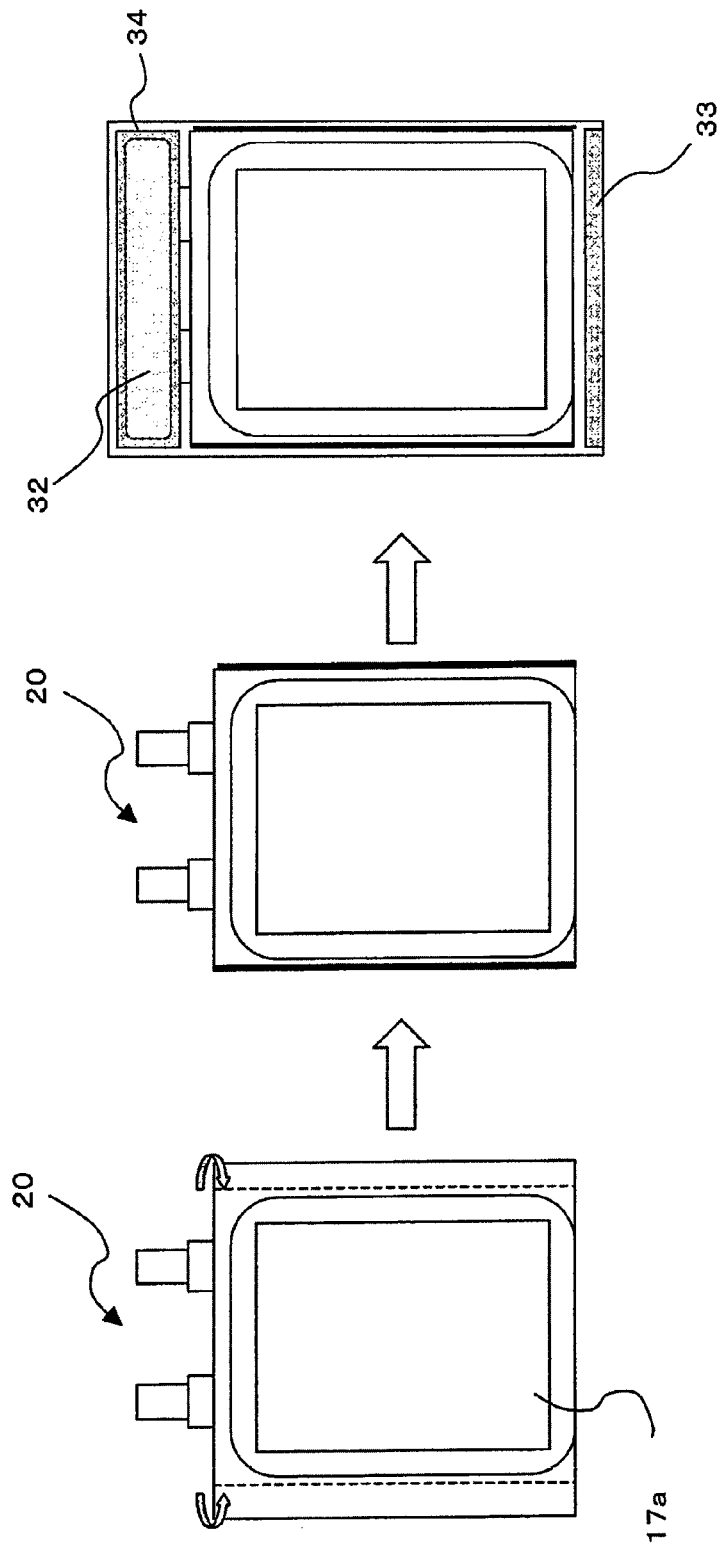

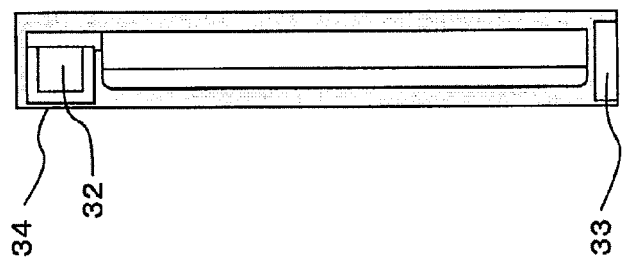
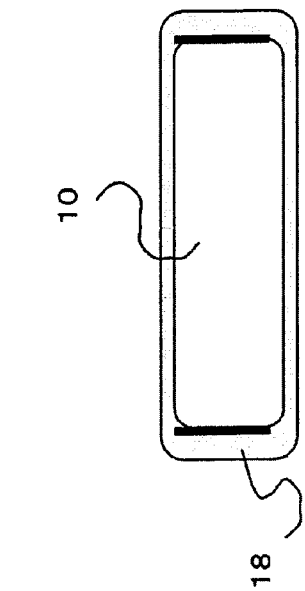

BATTERY PACK AND METHOD FOR PRODUCING THE SAME

CROSS-REFERENCE TO RELATED APPLICATIONS

The present application claims benefit of priority of Japanese patent Application No. 2008-19612 filed in the Japanese Patent Office on January 30, 2008, the entire disclosures of which are incorporated herein by reference.

BACKGROUND

The present application relates to a battery pack including a non-aqueous electrolyte secondary battery and a method for producing the same. More specifically, the present application relates to a battery pack including a battery and a protection circuit board which are integrated into a single device with a covering material and, wherein the battery includes a battery element covered with a packaging member, wherein the battery element includes a positive electrode and a negative electrode which are spirally wound together or stacked on one another through a separator, and a method for producing the same.

In recent years, various types of portable electronic devices, such as camera-integrated video tape recorders, cellular phones, and laptop computers, came on the market, and those having smaller size and weight are being developed. As the portable electronic devices are reduced in size and weight, a battery pack used as a portable power source for the electronic devices is required to have increased energy and reduced size and weight. As an example of the battery used in such a battery pack, there can be mentioned a lithium-ion secondary battery having a high capacity.

The lithium-ion secondary battery includes a battery element having a positive electrode and a negative electrode capable of being doped and dedoped with a lithium ion, wherein the battery element is sealed in a metallic can or a metal laminated film and controlled by a circuit board electrically connected to the battery element.

Some known lithium-ion secondary batteries constitute a battery pack including a battery element sealed in a metallic can or a metal laminated film and a circuit board, which are contained in a casing having upper and lower spaces divided (see, for example, Patent documents 1 to 3).

[Patent document 1] Japanese Patent No. 3556875
[Patent document 2] Japanese Patent No. 3614767
[Patent document 3] Japanese Patent No. 3643792

Among the known lithium-ion secondary batteries described above, the battery having a battery element sealed in a metallic can easily achieve a high dimensional accuracy, but this battery has a problem in that the thickness or weight of the battery is likely to be increased.

On the other hand, the battery having a battery element sealed in a metal laminated film is small in thickness and weight, as compared to the battery using a metallic can, but this battery has problems in that the size of the battery element largely varies and hence it is difficult to improve the dimensional accuracy of battery, and that the mechanical strength of battery is low.

In a known battery pack having a lithium-ion secondary battery which includes a battery element sealed in a metallic can or a metal laminated film, and a circuit board contained in a casing, for protecting the battery and circuit board from an external impact and the like, it is required that the casing has a satisfactory thickness. Further, in bonding together the upper and lower divided casings using an adhesive double-coated tape or by ultrasonic welding, the casings require a satisfactory thickness for facilitating the bonding of them, and the whole of the battery pack is inevitably increased in thickness or weight, and this battery pack has a problem in that it is unsuitable for portable power source.

SUMMARY

The present application addresses the above-identified issues associated with the developing technologies. It is desirable to provide a battery pack which is advantageous not only in that the battery pack has both high dimensional accuracy and high mechanical strength, but also in that the battery pack has reduced size and weight, and a method for producing the same.

The present inventors have conducted studies with a view toward the issues. As a result, it has been found that the above issues can be achieved by using a specific polyurethane resin as a shape-retaining polymer in the covering material for covering the battery and the protection circuit board which are integrated into a single device, and the present invention has been completed.

In an embodiment, there is provided a battery pack which includes a battery including a battery element covered with a packaging member, a protection circuit board the battery, and a covering material collectively covering the battery and the protection circuit board. The battery element includes a positive electrode and a negative electrode which are spirally wound together or stacked on one another through a separator. The covering material includes a shape-retaining polymer. The shape-retaining polymer contains an insulating curable polyurethane resin including polyol and polyisocyanate.

In another embodiment, there is provided a method for producing a battery pack which includes the steps of: placing a battery and a protection circuit board for the battery in a cavity of a mold; and filling a material for casing including a resin into the cavity of the mold containing therein the battery and the protection board, and curing the resin, to thereby produce a battery pack having a covering material for collectively covering the battery and the protection board in a state such that a terminals is electrically extended from the battery pack to the outside. The battery includes a battery element covered with a packaging member, wherein the battery element includes a positive electrode and a negative electrode which are spirally wound together or stacked on one another through a separator. The resin s a shape-retaining polymer, and the shape-retaining polymer contains an insulating curable polyurethane resin including polyol and polyisocyanate.

Additional features and advantages are described herein, and will be apparent from the following Detailed Description and the figures.

BRIEF DESCRIPTION OF THE DRAWINGS

FIGS. 4A to 4C are explanatory top views showing the process for covering a battery with a covering material to form a battery pack.

FIGS. 5A and 5B are cross-sectional views of a battery pack.

DETAILED DESCRIPTION OF EMBODIMENTS

Figure 1:
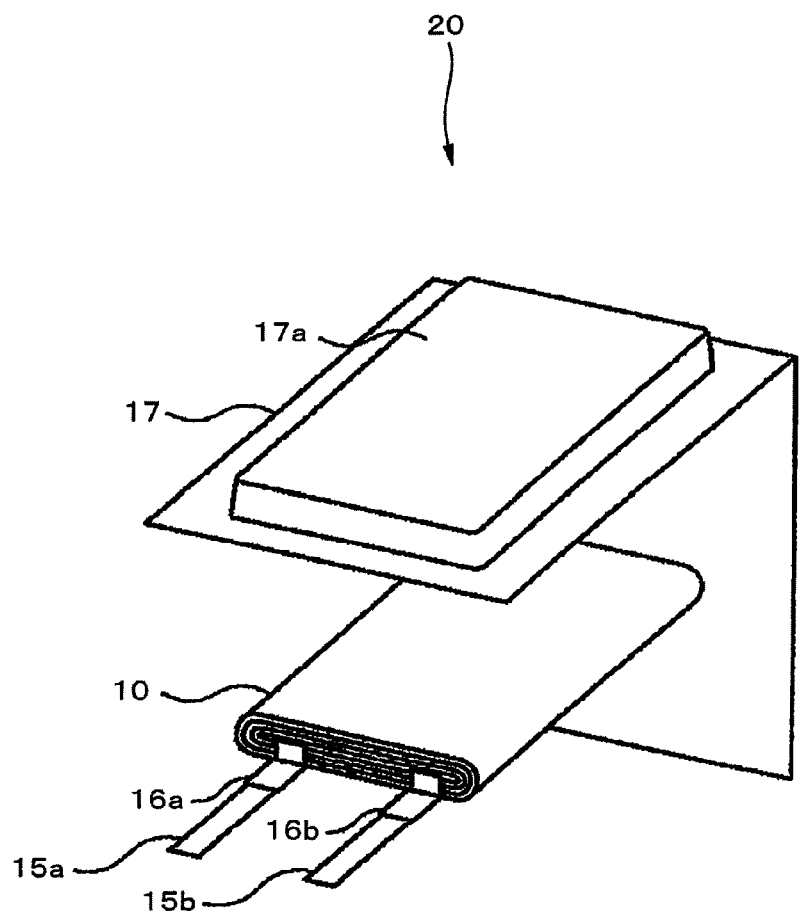
FIG. 1 is an exploded perspective view showing a battery, before covered with a covering material, in a battery pack according to an embodiment.

The battery pack according to an embodiment will be described in detail below. In the present specification, with respect to the concentration, content, amount, and others, "%" is given by mass unless otherwise specified.

The battery pack according to an embodiment includes: a battery including a battery element covered with a packaging member, wherein the battery element includes a positive electrode and a negative electrode which are spirally wound together or stacked on one another through a separator; a protection circuit board for the battery; and a covering material collectively covering the battery and the protection circuit board. The covering material includes a shape-retaining polymer, and the shape-retaining polymer contains an insulating curable polyurethane resin including polyol and polyisocyanate.

To use a covering material containing a resin, it is a general method that a battery and a protection circuit board are collectively covered with the covering material by a mold hot melt method or the like. In this case, there is selected to use a thermoplastic resin which is liquefied due to heating and solidified due to cooling, or a However, the thermoplastic resin exhibits fluidity when it is heated to a temperature higher by 50 to 150° C. than the melting temperature or glass transition temperature of the resin, and therefore it is required to be heated, generally to a temperature as high as 180 to 450° C. Further, the thermoplastic resin starts curing at a point in time when it is placed in a mold, and therefore, if a molded resin having a reduced thickness is obtained, a process is disadvantageously such that the resin curing near the injection hole in several seconds is poured from a very narrow gap into a large area. For this reason, with respect to the thermoplastic resin, even when the resin is reduced in viscosity by heating it to a high temperature, the injection pressure of the resin is increased, or the number of the injection holes in the mold is increased, it is difficult to produce a battery pack having a large area and having a thickness reduced to 250 μm or less, so that only a battery pack having a low volume energy density can be produced, as compared to a battery pack using a metallic can.

On the other hand, to use a known thermosetting resin, a curing temperature is as high as about 150° C. and it takes time to cure the thermosetting resin, and therefore the use of the thermosetting resin lowers the productivity.

A polyethylene-based separator generally used in a non-aqueous electrolyte secondary battery is shut down usually at a temperature of 120 to 140° C. and changes into a film which is impermeable to ions, whereby it becomes a possibility that the separator does not function as a separator.

An electrolyte constituting the battery (e.g., polyvinylidene fluoride used as a non-aqueous electrolyte) possibly changes in physical properties, or this change possibly causes the battery to deform.

Furthermore, with respect to the battery pack having a battery and a protection circuit board which are molded in one piece, there is also a possibility that a device incorporated into the protection circuit as a control part which operates when an abnormal current flows, such as a PCT (positive temperature coefficient; the term "positive temperature coefficient" means characteristics such that, as the temperature rises, the battery resistance increases, so that the positive coefficient varies), or a temperature fuse, suffers damage, so that the protection circuit board does not function as a protection circuit board.

According to an embodiment, by using an insulating curable polyurethane resin including polyol and polyisocyanate as a shape-retaining polymer constituting the covering material, the battery and the protection circuit board can be collectively covered with the covering material at a relatively low temperature (e.g., at 120° C. or lower), and, without damaging the battery and the protection circuit board, there can be provided a battery pack which is advantageous not only in that it has both a high dimensional accuracy and a high mechanical strength, but also in that it has reduced size and weight.

Furthermore, according to an embodiment, by using the covering material containing the insulating curable polyurethane resin, the dimensional accuracy is improved, and hence the covering material has a smaller thickness than that of a metallic plate and improves the yield, so that the resultant battery pack is improved in energy density.

Moreover, according to an embodiment, by using the covering material containing the insulating curable polyurethane resin, the productivity and excellent processability can be improved, and therefore a battery pack having a size, shape, strength, or the like according to various applications can be produced, and the degree of freedom for design is increased.

Covering Material; Shape-retaining Polymer

The shape-retaining polymer constituting the covering material in the battery pack of the embodiment contains an insulating curable polyurethane resin including polyol and polyisocyanate.

The term "insulating curable polyurethane resin" used herein means a polyurethane resin which forms a cured product having a volume resistivity (Ω·cm) of 1010 Ω·cm or more as measured at 25±5° C. and at 65±5% RH, and it is preferable that an insulating curable polyurethane resin forms a cured product having a volume resistivity of 1011 Ω·cm or more. Further, it is more preferable that an insulating curable polyurethane resin forms a cured product having a permittivity of 6 or less (1 MHz) and having a dielectric breakdown voltage of 15 kV/mm or more.

The volume resistivity is measured in accordance with JIS C2105, by a method in which a measurement voltage of 500 V is applied to a sample (thickness: 3 mm) at 25±5° C. and at 65±5% RH and, after 60 seconds, the volume resistivity is measured.

The polyol constituting the insulating curable polyurethane resin has an oxygen content of, preferably 30% or less, more preferably 20% or less.

When the polyol has an oxygen content of 30% or less, the resultant cured product is unlikely to change in physical properties and has excellent resistance to moist heat and is highly insulating, and thus the insulating curable polyurethane resin including such polyol can be advantageously used as the covering material constituting the battery pack.

The oxygen content (%) of the polyol is determined from the following formula.

Oxygen content of polyol (%)=(Total weight of oxygen in raw materials used for producing polyol)/ (Total weight of raw materials for polyol)× (Yield of polyol)

The polyol constituting the insulating curable polyurethane resin has an iodine value of, preferably 200 or less, more preferably 150 or less.

When the polyol used in the shape-retaining polymer constituting the covering material has an iodine value of 200 or less, the resultant cured product has such excellent heat resistance that, even when placed in an atmosphere at a high temperature, the cured product is not hardened or does not become brittle, and thus the insulating curable polyurethane resin including such polyol can be advantageously used as a covering material for collectively covering the battery and the protection circuit board.

The iodine value is measured in accordance with the method described in JIS K3331-1995.

With respect to the polyol constituting the insulating curable polyurethane resin, polyester polyol, polyether polyol, polyol having a principal chain composed of a carbon-carbon bond, or a mixture thereof is preferably used.

The polyester polyol is composed of a reaction product of a fatty acid and polyol, and the fatty acid is preferably, for example, at least one long-chain fatty acid having a hydroxyl group selected from the group consisting of ricinolic acid, oxycaproic acid, oxycapric acid, oxyundecanoic acid, oxylinoleic acid, oxystearic acid, and oxyhexanedecenoic acid.

The polyol reacted with the fatty acid is preferably, for example, at least one member selected from the group consisting of glycol, such as ethylene glycol, propylene glycol, butylene glycol, hexamethylene glycol, or diethylene glycol, trifunctional polyol, such as glycerol, trimethylolpropane, or triethanolamine, tetrafunctional polyol, such as diglycerol or pentaerythritol, hexafunctional polyol, such as sorbitol, and octafunctional polyol, such as maltose or sucrose. Further, examples include addition polymerization products of alkylene oxide corresponding to the above polyol and an aliphatic, alicyclic, or aromatic amine, and addition polymerization products of the above alkylene oxide and polyamide polyamine.

Of these, glyceride ricinoleate, polyester polyol of ricinolic acid and 1,1,1-trimethylolpropane, or the like is preferably used.

The polyether polyol is composed of an addition polymerization product of an alcohol and alkylene oxide, and the alcohol is preferably, for example, at least one member selected from the group consisting of ethylene glycol, diethylene glycol, propylene glycol, dipropylene glycol, dihydric alcohol, such as 1,3-butanediol, 1,4-butanediol, 4,4'-dihydroxyphenylpropane, or 4,4'-dihydroxyphenylmethane, and trihydric or polyhydric alcohol, such as glycerol, 1,1,1-trimethylolpropane, 1,2,5-hexanetriol, or pentaerythritol. The alkylene oxide is preferably, for example, at least one member selected from the group consisting of ethylene oxide, propylene oxide, butylene oxide, and α-olefin oxide.

The polyol having a principal chain composed of a carbon-carbon bond is preferably, for example, at least one member selected from the group consisting of acrylic polyol, polybutadiene polyol, polyisoprene polyol, hydrogenated polybutadiene polyol, polycarbonate polyol, polyol obtained by graft-polymerizing acrylonitrile (AN) or styrene monomer (SM) on polyol composed of a carbon-carbon bond, and polytetramethylene glycol (PTMG).

It is preferred that the polyol constituting the insulating curable polyurethane resin contains a powdered material.

By virtue of the powdered material contained in the polyol, the insulating curable polyurethane resin including the polyol containing the powdered material and polyisocyanate exhibits excellent thixotropy when the battery and the protection circuit board are collectively covered with the covering material, thereby improving the workability. Further, by virtue of the powdered material contained in the polyol, a covering material formed using the insulating curable polyurethane resin including the polyol containing the powdered material and polyisocyanate has advantages in that the surface hardness, heat resistance, and heat dissipation are improved.

Examples of the powdered materials include inorganic particles of calcium carbonate, aluminum hydroxide, aluminum oxide, silicon oxide, titanium oxide, silicon carbide, silicon nitride, calcium silicate, magnesium silicate, or carbon, and particles of an organic polymer, such as polymethyl acrylate, polyethyl acrylate, polymethyl methacrylate, polyethyl methacrylate, polyvinyl alcohol, carboxymethyl cellulose, polyurethane, or polyphenol. These powdered materials may be used individually or in combination. Each particle constituting the powdered material may have a surface treated, and polyurethane or polyphenol used as a powdered material may be in the form of foam powder. Further, the powdered material includes a porous powdered material.

With respect to the polyisocyanate constituting the insulating curable polyurethane resin, aromatic polyisocyanate, aliphatic polyisocyanate, alicyclic polyisocyanate, or a mixture thereof is preferably used.

Examples of the aromatic polyisocyanates include diphenylmethane diisocyanate (MDI), polymethylene polyphenylene polyisocyanate (crude MDI), tolylene diisocyanate (TDI), polytolylene polyisocyanate (crude TDI), xylene diisocyanate (XDI), and naphthalene diisocyanate (NDI).

Examples of the aliphatic polyisocyanates include hexamethylene diisocyanate (HDI).

Examples of the alicyclic polyisocyanates include isophorone diisocyanate (IPDI).

Further examples of the polyisocyanates include carbodiimide-modified polyisocyanate obtained by modifying the above polyisocyanate with carbodiimide, isocyanurate-modified polyisocyanate obtained by modifying the polyisocyanate with isocyanurate, and an urethane polymer having an isocyanate group at the end of molecule, which is a reaction product of polyol and the excess polyisocyanate.

These polyisocyanates may be used individually or in combination.

Of these, diphenylmethane diisocyanate, polymethylene polyphenylene polyisocyanate, or carbodiimide-modified polyisocyanate is preferably used.

The insulating curable polyurethane resin may contain a catalyst to advance a reaction of polyol and polyisocyanate or dimerization or trimerization of isocyanate. With respect to the catalyst, a well-known catalyst for advancing the above reaction may be used, and examples include amine catalysts, cyanurate-forming metal catalysts, and organotin compounds.

Examples of the amine catalysts include tertiary amines, such as triethylenediamine, 2-methyltriethylenediamine, tetramethylhexanediamine, pentamethyldiethylenetriamine, pentamethyldipropylenetriamine, pentamethylhexanediamine, dimethylaminoethyl ether, trimethylaminopropylethanolamine, tridimethylaminopropylhexahydrotriazine, and tertiary ammonium salts.

Examples of the cyanurate-forming metal catalysts include metal salts of fatty acid, and specific examples include dibutyltin dilaurate, lead octylate, potassium ricinoleate, sodium ricinoleate, potassium stearate, sodium stearate, potassium oleate, sodium oleate, potassium acetate, sodium acetate, potassium naphthenate, sodium naphthenate, potassium octylate, sodium octylate, and mixtures thereof.

When using a cyanurate-forming metal catalyst, an isocyanurate ring may be introduced into the molecule of the insulating curable polyurethane resin. By virtue of the isocyanurate ring present in the molecule, the resultant cured product is advantageously improved in flame retardancy and heat resistance.

It is preferred that the cyanurate-forming metal catalyst is used in an amount in the range of from 0.5 to 20 parts by weight, relative to 100 parts by weight of the polyol. When the amount of the isocyanurate-forming metal catalyst is smaller than 0.5 parts by weight, the satisfactory isocyanurate formation does not proceed. On the other hand, even when the amount of the isocyanurate-forming metal catalyst is larger than 20 parts by weight, relative to 100 parts by weight of the polyol, an effect expected by such a large amount of the catalyst may not be obtained. butyltin trichloride, dimethyltin dichloride, dibutyltin dichloride, and trimethyltin hydroxide.

The catalyst may be either used directly or used in the form of a solution in a solvent, such as ethyl acetate, having a concentration of 0.1 to 20% and added in an amount of 0.01 to 5 parts by weight, relative to 100 parts by weight of the isocyanate, in terms of a solids content. When the catalyst is used directly or in the form of a solution, the amount of the catalyst added is preferably 0.01 to 5 parts by weight, especially preferably 0.05 to 1 part by weight, relative to 100 parts by weight of the isocyanate, in terms of a solids content. When the amount of the catalyst added is too small, e.g., less than 0.01 parts by weight, curing of the polyurethane resin is too slow to obtain a resin state. On the other hand, when the amount of the catalyst added is more than 5 parts by weight, the resin is formed extremely fast, thereby making it difficult to mold the resin into a shape-retaining polymer constituting the covering material for the battery pack.

The shape-retaining polymer used in the covering material for the battery pack may contain, in addition to the insulating curable polyurethane, an additive, such as filler, a flame retardant, an anti-foaming agent, an anti-fungus agent, a stabilizer, a plasticizer, a thickening agent, a mildewproofing agent, or another resin, in such an amount that the curing properties are not sacrificed.

Among the additives, for example, with respect to the flame retardant, triethyl phosphate, tris(2,3-dibromopropyl) phosphate, or the like may be used.

With respect to other additives, filler, such as antimony trioxide or zeolite, or a coloring agent, such as a pigment or a dye, may be used.

Covering Material; Filler Material

It is preferred that the covering material constituting the battery pack contains, in addition to the shape-retaining polymer, a filler material including a metal oxide, a metal nitride, or the like. Accordingly, the shape-retaining polymer containing the insulating curable polyurethane resin preferably has affinity, compatibility, and reactivity with the filler material. The shape-retaining polymer further preferably has excellent adhesion with the metal laminated film and excellent dimensional stability or moldability.

With respect to the filler material, ceramic filler, metal oxide filler, or metal nitride filler may be used.

Examples of metal oxide filler or metal nitride filler include oxides or nitrides of silicon (Si), aluminum (Al), titanium (Ti), zirconium (Zr), zinc (Zn), or magnesium (Mg) and arbitrary mixtures of the above oxides or nitrides. The metal oxide or metal nitride filler improves the covering material in hardness and heat conduction, and a layer including the metal oxide filler or metal nitride filler may be disposed in contact with a layer including the shape-retaining polymer, or the metal oxide filler or metal nitride filler may be mixed into a layer including the shape-retaining polymer. In this case, it is preferred that the metal oxide filler or metal nitride filler is uniformly dispersed in the whole of the layer of shape-retaining polymer.

The amount of the filler material mixed may be appropriately changed depending on the type of the shape-retaining polymer, but the amount is preferably 3 to 60%, based on the total mass of the shape-retaining polymer. When the amount of the filler material mixed is less than 3%, it is likely that a covering material having satisfactory hardness is not obtained. On the other hand, when the amount of the filler material mixed is more than 60%, a problem of the moldability in the production or the brittleness of ceramic possibly occurs.

When the filler material has too small an average particle size, the hardness of the covering material is increased, but filling of a mold with the material during the molding is adversely affected, which leads to a problem in productivity. On the other hand, when the filler material has too large an average particle size, a desired strength is difficult to obtain, so that there is a possibility that satisfactory dimensional accuracy for the battery pack may not be achieved. Accordingly, it is preferable that the filler material has an average particle size of 0.5 to 40 µm, more preferably 2 to 20 µm.

With respect to the form of the filler material, various forms, such as a spherical form, a flake form, a plate form, and a needle-like form, may be employed. There is no particular limitation, but a filler material in a spherical form is preferred since it is easy to prepare and the filler material having a uniform average particle size can be obtained at low cost, and a filler material in a needle-like form having a high aspect ratio is preferred since the filler material easily improves the strength. A filler material in a flake form is preferred since the filling properties can be improved when the amount of the filler material mixed is increased. According to the use or material, filler materials having different average particle sizes or forms may be used in combination.

The covering material may contain an additive in addition to the shape-retaining polymer and the filler material. For example, together with the shape-retaining polymer, a curing agent, an ultraviolet light absorber, a light stabilizer, or an arbitrary mixture thereof may be used.

Properties of Covering Material

By using the covering material containing the insulating curable polyurethane resin as a shape-retaining polymer, the battery pack according to the embodiment is advantageous not only in that it has a high dimensional accuracy and a high impact resistance as well as a high mechanical strength, but also in that it can be reduced in size (thickness) and weight.

It is preferable that the covering material has the values of physical properties shown below.

The covering material containing a curable polyurethane resin which is the insulating shape-retaining polymer has a glass transition temperature (Tg) of, preferably 45 to 130° C., more preferably 65 to 120° C., further preferably 75 to 110° C., as measured by differential scanning calorimetry (DSC).

It is preferred that the covering material has an excellent impact resistance and an excellent mechanical strength in a usual operation and, conversely, in an unusual operation, the covering material easily breaks open to permit gas generated from the battery to easily go out of the battery pack. With respect to the shape-retaining polymer constituting the above covering material, a curable polyurethane resin is preferably used.

For meeting the above requirement, it is preferred that the covering material including the shape-retaining polymer has a glass transition temperature which is equal to or higher than the temperature in a usual operation of the battery pack, and which is equal to or lower than the temperature in an unusual operation.

When the glass transition temperature is lower than 45° C., the glass transition temperature of the covering material including the shape-retaining polymer is possibly lower than the temperature in a usual operation, and thermal motion of the polymer constituting the shape-retaining polymer in a usual operation is hardly suppressed, so that it is difficult to keep the hardness, thereby disadvantageously making it difficult to achieve an excellent mechanical strength.

On the other hand, when the glass transition temperature is higher than 130° C., the glass transition temperature of the covering material including the shape-retaining polymer is possibly higher than the temperature in an unusual operation, and thermal motion of the polymer constituting the shape-retaining polymer in an unusual operation is suppressed, so that the covering material hardly breaks open, thereby disadvantageously making it difficult to permit gas generated in an unusual operation to quickly go out of the battery pack.

The covering material including the shape-retaining polymer has a flexural strength of, preferably 10 to 120 MPa, more preferably 20 to 110 MPa, further preferably 70 to 100 MPa, as measured by a flexural property test method for plastic described in JIS K7171.

The covering material including the shape-retaining polymer has a flexural modulus of, preferably 30 to 3,000 MPa, more preferably 900 to 2,550 MPa, further preferably 1,000 to 2,500 MPa, as measured by a flexural property test method for plastic described in JIS K7171.

The covering material including the shape-retaining polymer has a surface hardness of, preferably D30 to D99, more preferably D60 to D90, further preferably D60 to D85, as measured by a durometer hardness test method for plastic described in JIS K7215.

With respect to the durometer D hardness, when the covering material has D30 to D99, the covering material advantageously has a high impact resistance and a high mechanical strength.

It is preferred that the covering material has a durometer D hardness, as measured at the temperature in an unusual operation, for example, at a temperature of 60° C. or higher, which is smaller than the durometer D hardness as measured in the reference atmosphere (at a temperature of 23±2° C. and at 50±5% RH) descried in JIK7215. When the hardness of the covering material at the temperature in an unusual operation is smaller than the hardness at the temperature in a usual operation, the covering material easily breaks open due to the gas generated in an unusual operation, and, even when the covering material breaks open, the gas can be permitted to quickly go out of the battery pack.

The covering material has a reduced thickness, for example, a thickness of 1,000 μm or less at the pack portion on the largest side of, e.g., a rectangular battery used for portable electronic device.

When the covering material has a thickness of more than 1,000 μm, a battery pack produced using this covering material inevitably sacrifices the merit of volume energy density.

The covering material further preferably has a thickness of 300 μm or less, and preferably has a smaller thickness as long as the impact resistance and mechanical strength required for the battery pack are achieved.

When a combination of the shape-retaining polymer and filler is used in the covering material, there are obtained higher strength and more excellent impact resistance than those conventionally obtained when an aluminum metal is used or a thermoplastic resin and a metal are used in combination, and therefore, when an equivalent strength is needed, a covering material having a smaller thickness than that of a conventional covering material can be produced, thereby improving the volume energy density. A covering material having an increased thickness achieves a battery pack having higher strength and higher reliability than those of a conventional covering material. Furthermore, the size or shape of battery can be arbitrarily selected, and the battery can be applied to a large-size battery for bicycle, automobile, or backup power source, and has freedom for design such that the covering material is designed to have strength required for a desired portion.

The battery pack according to the embodiment using the above-described covering material is described below with reference to the accompanying drawings.

FIG. 1 is an exploded perspective view showing a non-aqueous electrolyte secondary battery, before covered with a covering material, in a battery pack according to an embodiment.

In this figure, a battery 20 includes a battery element 10 covered with a metal laminated film 17 which is an example of a packaging member, and the battery element 10 is contained in a container portion 17a (space portion 17a) formed in the laminated film 17, and the edge portions of the laminated film are sealed up. In the present embodiment, the space portion 17a has a space in a rectangular plate form according to the battery element 10 in a rectangular plate form.

With respect to the packaging member covering the battery element 10, a well-known metal laminated film may be used, and an aluminum laminated film may especially preferably used. With respect to the aluminum laminated film, a film suitable for drawing and for forming the container portion 17a for containing therein the battery element 10 is advantageously used.

It is preferred that the packaging member for covering the battery element 10 is a film composed of a single layer or two or more layers and includes a polyolefin film.

For example, there may be used an aluminum laminated film having a stacked structure including a bonding layer and a surface protective layer disposed on both sides of an aluminum layer. An aluminum laminated film preferably used is such that, in the order from the inner side, i.e., the side of the surface of the battery element 10, a polypropylene layer (PP layer) as a bonding layer, an aluminum layer as a metal layer, and a nylon layer or polyethylene terephthalate layer (PET layer) as a surface protective layer are disposed.

The construction of the battery element 10 is described below.

Figure 2:
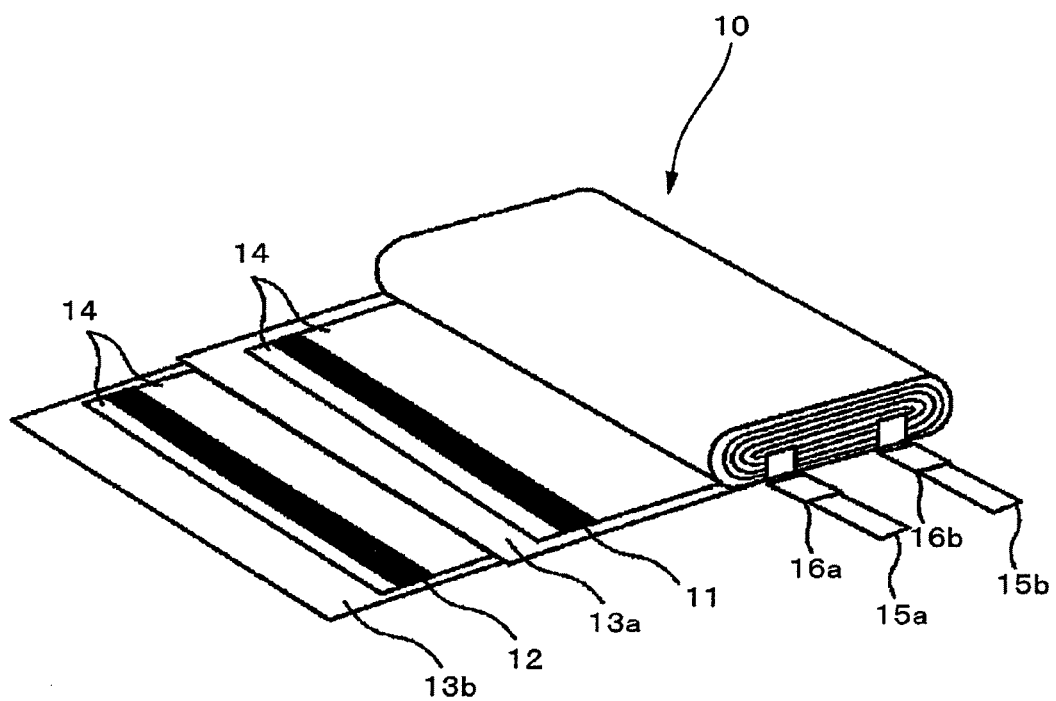
FIG. 2 is a perspective view showing the structure of a battery element to be covered with and contained in a packaging member (laminated film).

FIG. 2 is a perspective view showing the structure of the battery element 10 to be covered with and contained in the laminated film 17 as a packaging member. In this figure, the battery element 10 includes a strip-shaped positive electrode 11, a separator 13a, a strip-shaped negative electrode 12 disposed opposite to the positive electrode 11, and a separator 13b, which are stacked on one another and spirally wound together in the longitudinal direction, and a gel electrolyte 14 is applied to both sides of each of the positive electrode 11 and the negative electrode 12.

From the battery element 10 are electrically extended a positive electrode terminal 15a connected to the positive electrode 11 and a negative electrode terminal 15b connected to the negative electrode 12 (hereinafter, referred to as "electrode terminal 15" unless otherwise specified), and the positive electrode terminal 15a and the negative electrode terminal 15b are, respectively, coated with sealants 16a and 16b (hereinafter, frequently referred to as "sealant 16" unless otherwise specified) as a resin piece composed of maleic anhydride-modified polypropylene (PPa) or the like for improving the adhesion with the laminated film 17 which covers the battery element later.

Hereinbelow, constituents of the above-described battery (before covered with the covering material) are described in detail.

Positive Electrode

The positive electrode includes a cathode active material layer including a cathode active material and being formed on both sides of a positive electrode current collector. The positive electrode current collector is composed of a metallic foil, such as an aluminum (Al) foil. On the other hand, the cathode active material layer includes, for example, a cathode active material, a conductor, and a binder. The cathode active material, conductor, binder, and solvent may be mixed in any amounts as long as they are uniformly dispersed.

With respect to the cathode active material, a metal oxide, a metal sulfide, or a specific polymer may be used according to the type of a desired battery. For example, when a lithium-ion battery is formed, there may be mainly used a composite oxide of lithium and a transition metal, represented by the following formula (1):

$$Li_xMO_2 \qquad (1)$$

wherein M represents at least one transition metal, and X varies depending on the charged or discharged state of the battery, and is generally 0.05 to 1.10.

With respect to the transition metal (M) constituting the lithium composite oxide, cobalt (Co), nickel (Ni), manganese (Mn), or the like may be used.

Specific examples of the lithium composite oxides include $LiCoO_2$, $LiNiO_2$, $LiMn_2O_4$, and $LiNi_yCO_{1-y}O_2$ (0<y<1).

A solid solution obtained by replacing part of the transition metal element in the lithium composite oxide by another element may be used, and examples of the solid solutions include $LiNi_{0.5}Co_{0.5}O_2$ and $LiNi_{0.8}Co_{0.2}O_2$. These lithium composite oxides can generate a high voltage and have an excellent energy density. Alternatively, with respect to the cathode active material, a metal sulfide or oxide containing no lithium, such as $TiS_2$, $MoS_2$, $NbSe_2$, or $V_2O_5$, may be used. These cathode active materials may be used individually or in combination.

With respect to the conductor, a carbon material, such as carbon black or graphite, may be used. With respect to the binder, for example, polyvinylidene difluoride(PVDF) or polytetrafluoroethylene may be used. With respect to the solvent, for example, N-methylpyrrolidone may be used.

The cathode active material, binder, and conductor are uniformly mixed together to prepare a cathode mixture, and the cathode mixture prepared is dispersed in a solvent to form a slurry. Then, the resultant slurry is uniformly applied to the positive electrode current collector by a doctor blade method or the like, and then dried at a high temperature to remove the solvent, followed by pressing, thereby forming a cathode active material layer.

The positive electrode 11 has a positive electrode terminal 15a connected to one end of the positive electrode current collector by spot welding or ultrasonic welding. The positive electrode terminal 15a is desirably composed of a metallic foil or mesh, but the terminal may be composed of any material other than metals as long as the material is electrochemically and chemically stable and can achieve electrical conduction. Examples of materials for the positive electrode terminal 15a include aluminum.

Negative Electrode

The negative electrode includes an anode active material layer including an anode active material and being formed on both sides of a negative electrode current collector. The negative electrode collector is composed of a metallic foil, such as a copper (Cu) foil, a nickel foil, or a stainless steel foil.

The anode active material layer includes, for example, an anode active material, and optionally a conductor and a binder. Like the cathode active material, the anode active material, conductor, binder, and solvent may be mixed in any amounts.

With respect to the anode active material, lithium metal, a lithium alloy, a carbon material capable of being doped and dedoped with lithium, or a composite material of a metal material and a carbon material may be used.

Specific examples of carbon materials capable of being doped and dedoped with lithium include graphite, hardly graphitizable carbon, and easily graphitizable carbon. More specifically, a carbon material, such as pyrolytic carbon, coke (pitch coke, needle coke, or petroleum coke), graphite, glassy carbon, a calcined product of an organic polymer compound (obtained by carbonizing a phenolic resin, a furan resin, or the like by calcination at an appropriate temperature), carbon fiber, or activated carbon, may be used.

Further, with respect to the material capable of being doped and dedoped with lithium, a polymer, such as polyacetylene or polypyrrole, or an oxide, such as SnO2, may be used.

With respect to the material capable of being alloyed with lithium, various types of metals may be used, but tin (Sn), cobalt (Co), indium (In), aluminum, silicon (Si), or an alloy thereof is often used. When using lithium metal, it is not always necessary to mix lithium powder with a binder to form a coating film, and a method may be employed in which a rolled lithium metallic foil is bonded with a current collector by pressing.

With respect to the binder, for example, polyvinylidene fluoride or a styrene-butadiene rubber may be used. With respect to the solvent, for example, N-methylpyrrolidone or methyl ethyl ketone may be used.

The anode active material, binder, and conductor are uniformly mixed together to prepare an anode mixture, and the anode mixture prepared is dispersed in a solvent to form a slurry. Then, the resultant slurry is uniformly applied to the negative electrode current collector by the same method as that for the positive electrode, and then dried at a high temperature to remove the solvent, followed by pressing, thereby forming an anode active material layer.

As in the case of the positive electrode 11, the negative electrode 12 has a negative electrode terminal 15b connected to one end of the current collector by spot welding or ultrasonic welding, and the negative electrode terminal 15b may be composed of any material other than metals as long as the material is electromechanically and chemically stable and can achieve electrical conduction. Examples of materials for the negative electrode terminal 15b include copper and nickel.

The positive electrode terminal 15a and the negative electrode terminal 15b are electrically extended from the same side, and, when the battery element 10 is in a rectangular plate form, for example, as shown in FIG. 2, it is preferred that the positive electrode terminal 15a and the negative electrode terminal 15b are electrically extended from the same side (generally one short side), but they may be electrically extended from any sides as long as short-circuiting or the like does not occur and there is no adverse effect on the battery performance.

With respect to the joint of the positive electrode terminal 15a and the negative electrode terminal 15b, the joint position and the method for the joint are not limited to the examples described above as long as electrical contact can be made.

Electrolytic Solution

In the electrolytic solution, an electrolyte salt and a non-aqueous solvent generally used in lithium-ion battery may be used.

Specific examples of non-aqueous solvents include ethylene carbonate, propylene carbonate, γ-butyrolactone, dimethyl carbonate, diethyl carbonate, ethylmethyl carbonate, dipropyl carbonate, ethylpropyl carbonate, and solvents obtained by replacing the hydrogen in the above carbonates by a halogen. These solvents may be used individually or in combination.

With respect to the lithium salt as an example of electrolyte salt, a material used in a general electrolytic solution for battery may be used. Specific examples include LiCl, LiBr, LiI, $LiClO_3$, $LiClO_4$, $LiBF_4$, $LiPF_6$, $LiNO_3$, $LiN(CF_3SO_2)_2$, $LiN(C_2F_5SO_2)_2$, $LiAsF_6$, $LiCF_3SO_3$, $LiC(SO_2CF_3)_3$, $LiAlCl_4$, and $LiSiF_6$. From the viewpoint of achieving excellent oxidative stability, LiPF6 or LiBF4 is desired. These lithium salts may be used individually or in combination.

The concentration of the lithium salt dissolved in the non-aqueous solvent may be any concentration as long as the lithium salt may be dissolved in the above non-aqueous solvent, but the lithium ion concentration in the non-aqueous solvent is preferably in the range of from 0.4 to 2.0 mol/k.

When using a gel electrolyte, the electrolytic solution is gelled with a matrix polymer to obtain a gel electrolyte.

With respect to the matrix polymer, there may be used any polymer which is compatible with the non-aqueous electrolytic solution including the electrolyte salt dissolved in the non-aqueous solvent and which can be gelled. Examples of the matrix polymers include polymers including polyvinylidene fluoride, polyethylene oxide, polypropylene oxide, polyacrylonitrile, or polymethacrylonitrile in the repeating units. These polymers may be used individually or in combination.

Of these, a preferred matrix polymer is polyvinylidene fluoride or a copolymer including hexafluoropropylene in an amount of 7.5% or less incorporated into polyvinylidene fluoride. The polymer generally has a number average molecular weight in the range of from $5.0 \times 10^5$ to $7.0 \times 10^5$ (500,000 to 700,000) or a weight average molecular weight in the range of from $2.1 \times 10^5$ to $3.1 \times 10^5$ (210,000 to 310,000) and an intrinsic viscosity in the range of from 1.7 to 2.1 dl/g.

Separator

The separator is composed of, for example, a porous film made of a polyolefin material, such as polypropylene (PP) or polyethylene (PE), or a porous film made of an inorganic material, such as ceramic nonwoven fabric, and may be composed of two or more porous films stacked into a laminated structure. Of these, a porous film made of polyethylene or polypropylene may be more effective.

Generally, the usable separator has a thickness of, preferably 5 to 50 μm, more preferably 7 to 30 μm. When the separator has too large a thickness, the ratio of the active material to the separator is reduced to lower the battery capacity, and further the ion conduction properties become poor, so that the current properties become poor. On the other hand, when the separator has too small a thickness, the film of separator is reduced in mechanical strength.

Fabrication of Battery

The gel electrolyte solution thus prepared is uniformly applied to each of the positive electrode 11 and the negative electrode 12 so that the cathode active material layer and the anode active material layer are individually impregnated with the gel electrolyte solution, followed by storage at a room temperature or drying, to form a gel electrolyte layer 14.

Then, using the positive electrode 11 and the negative electrode 12 each having the gel electrolyte layer 14 formed thereon, the positive electrode 11, separator 13a, negative electrode 12, and separator 13b are stacked on one another in this order and then spirally wound together to form a battery element 10.

Subsequently, the battery element 10 is contained in a container portion (space portion) 17a of a laminated film 17 and covered with the film to obtain a non-aqueous gel electrolyte secondary battery.

In the present embodiment, as shown in FIGS. 1 and 2, the battery element 10 is covered with the laminated film 17 as described above, and the film around the battery element 10 is heat-sealed to form a battery 20.

Figure 3A:
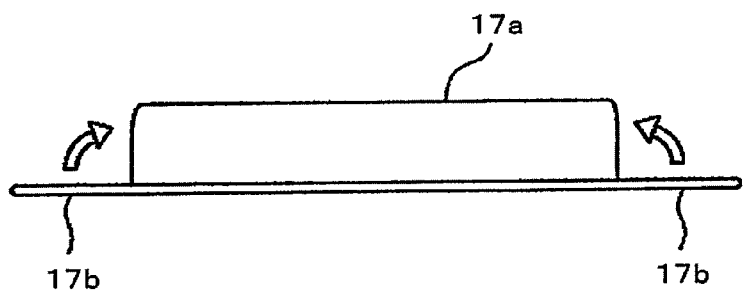
FIGS. 3A and 3B are end views showing a portion around the sidewall of the battery shown in FIG. 1.
Figure 3B:
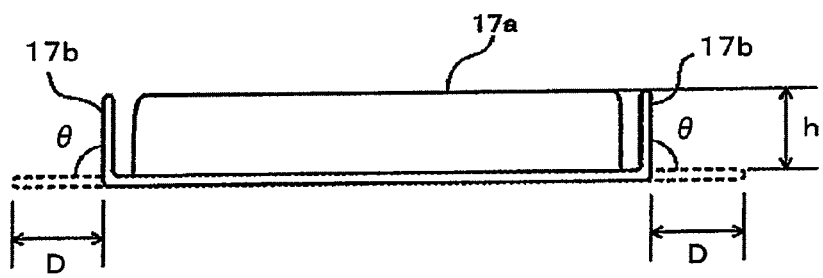

The battery element 10 is covered with the aluminum laminated film 17 and the film is sealed and then, as shown in FIGS. 3A and 3B, portions 17b on both sides of the container portion 17a containing the battery element 10 (hereinafter, frequently referred to as "side sealing portions") are bent in the direction of the container portion 17a.

It is preferred that the bent angle θ is in the range of from 80 to 100.

When the bent angle is less than 80°, the side sealing portions 17b on both sides of the container portion 17a are opened so widely that the width of the battery 20 is increased, thereby making it difficult to reduce the battery 20 in size and improve the battery capacity. A bent angle of 100° as the upper limit is determined depending on the form of the container portion 17a, and, when the container portion contains therein a flat-type battery element 10, the upper limit of the bent angle is about 100°. The heat-sealed width for the side sealing portion 17b is preferably 0.5 to 2.5 mm, more preferably 1.5 to 2.5 mm.

For reducing the battery 20 in size and improving the battery capacity, it is preferred that the bent width D of the side sealing portion 17b is equal to or less than the height h of the container portion 17a or the thickness of the battery element 10. Further, for reducing the battery 20 in size and improving the battery capacity, it is preferred that the number of bending is one.

Next, a method for producing a battery pack according to an embodiment of the present application is described.

In the method for producing a battery pack of the present application, the non-aqueous electrolyte secondary battery thus prepared is placed in a cavity of a mold (mold cavity), together with a protection circuit board being capable of controlling a voltage and a current of the battery and a spacer, and the battery and the protection circuit board are disposed in a predetermined position within the cavity using the spacer, and then the cavity is filled with a material for casing including the shape-retaining polymer and a filler material and the material for casing is cured, thereby obtaining a battery pack covered with a covering material.

With respect to the material for casing including the shape-retaining polymer containing the insulating curable polyurethane resin and the filler material, for preventing the battery from suffering heat damage and for improving the production efficiency, the temperature at which the material for casing is injected into the cavity is preferably a room temperature to 120° C., more preferably a room temperature to 90° C.

In filling the mold cavity with the material for casing, particularly the material for casing having a high viscosity, for preventing the formation of a gap between the material and the mold within the cavity, generally, the cavity is required to be filled with the material for casing while applying a predetermined pressure to the material.

In this case, for preventing the battery and the protection circuit board placed in the mold cavity from moving from a predetermined position due to the material for casing filled by the application of pressure, various methods may be employed. As examples of methods, there can be mentioned a method in which a positioning protrusion is provided in the mold, and a method in which the material for casing is filled in two or more portions into the cavity and the battery and protection circuit board can stay in a predetermined position in the cavity in a portion into which the material is not filled and then whole of the cavity is filled with the material for casing.

In addition, there can be mentioned a method in which a tape, rubber piece, or mesh part to be covered with the covering material together with the battery and protection circuit board is wound round the battery and used as a positioning part. There can be mentioned a method in which a metal piece, such as an aluminum, iron, or SUS plate, is disposed on one side of the battery and the portion other than the metal piece is collectively sealed by the material for casing, thereby positioning the battery and the protection circuit board.

Further, there can be mentioned a method in which the battery including a battery element covered with a packaging member is bonded with another member constituting the battery pack, e.g., a frame resin part or a top cover part containing a top substrate, and the battery bonded with the member and the protection circuit board are placed in the mold cavity, so that they can stay in a predetermined position within the cavity.

With respect to the mold used in the above embodiment, there is no particular limitation as long as the battery 20 covered with the aluminum laminated film 17, the protection circuit board, and a cushioning material (mentioned later) optionally used may be disposed in the cavity of the mold. The mold has generally two or more gates for introducing a postcuring molding material into the cavity. Accordingly, in the resultant battery pack, the cured excess molding material according to the gates remains on any portion of the covering material.

In the present embodiment, the excess molding material is trimmed away, but a slight resin filling mark is left.

The protection circuit is generally disposed above the positive electrode terminal 15a and the negative electrode terminal 15b (see FIG. 1). When the battery 20 is in a rectangular plate form (the covering material to be formed is rectangular), the cushioning material is disposed on the side from which the terminals 15a and 15b are electrically extended or the opposite side, or both.

Specifically, in FIG. 1, the cushioning material is disposed on one short side or both short sides of the battery 20 in a rectangular plate form.

The protection circuit board and cushioning material thus disposed are molded in one piece with the battery 20 by the molding material.

The cushioning material not only protects the battery and the protection circuit board but also improves the resultant battery pack in impact resistance.

Accordingly, as a material for the cushioning material, there is preferably used a resin having an impact resistance and excellent dimensional accuracy, such as polycarbonate, and acrylonitrile-butadiene-styrene (ABS) resin accuracy, such as polycarbonate, an acrylonitrile-butadiene-styrene (ABS) resin, polypropylene, or polyethylene, a metal, such as aluminum or stainless steel, or a resin material having insert-molded thereinto a metal material, such as aluminum.

FIGS. 4A to 4C are explanatory top views showing the process for covering a battery with a covering material to form a battery pack according to the present embodiment.

The battery 20 is first bent along broken lines shown in the figure (see FIGS. 4A and 4B), and a protection circuit board 32 and a top-side cushioning material 34 are disposed on the top side and a bottom-side cushioning material 33 is disposed on the bottom side, and a not shown mold is set. Then, a material for casing including the shape-retaining polymer and filler is injected into the mold while applying a pressure to the material and cured, thereby obtaining a battery pack 30 according to the present embodiment having an aluminum laminated film 17 covered with a covering material 18 (see FIG. 4C).

A cross-sectional view of the obtained battery pack 30, taken along the line parallel to the bottom, is shown in FIG. 5A, and a cross-sectional view of the battery pack, taken along the line in the direction of the electrode terminal, is shown in FIG. 5B.

In the above embodiment, the non-aqueous electrolyte secondary battery 20 using a gel electrolyte is described, but embodiments of the present application can be applied to a laminated film-covered battery using an electrolytic solution. In this case, the step for applying a gel electrolyte to the surfaces of the positive electrode and negative electrode in the above embodiment is omitted, and a step for filling an electrolytic solution is inserted into the heat-sealing step for laminated film.

More specifically, three sides of the battery element 10 in a rectangular plate form are heat-sealed and then an electrolytic solution is injected through the remaining one open side, followed by heat sealing of the side. The resultant sealed portion has totally a form of rectangular frame.

According to embodiments of the present application, there can be obtained a battery pack which is advantageous not only in that it has both high dimensional accuracy and high mechanical strength, but also in that it has reduced size and weight. The battery pack generally has a connection terminal for connecting the battery to an external electronic device, but the descriptions of this are omitted in the above embodiment.

According to an embodiment, the covering material including a shape-retaining polymer containing the insulating curable polyurethane resin is used, and hence the battery pack is advantageous not only in that it has both high dimensional accuracy and high mechanical strength, but also in that it has reduced size and weight. Consequently, the battery pack can be advantageously used as a battery for mobile electronic devices, such as a cellular phone, a laptop computer, a digital camera, and a handy camcorder, a secondary battery for high power applications, such as an electric car and a hybrid car, or a battery for power tool.

EXAMPLES

Hereinbelow, the present invention will be described in more detail with reference to the following Examples and Comparative Examples, which should not be construed as limiting the scope of the present application.

Examples 1 to 6

Insulating curable polyurethane resins each including the polyol composed of a carbon-carbon bond and polyisocyanate shown in Table 1 were respectively used. The polyol and polyisocyanate were mixed in a 1:2 ratio (polyol:polyisocyanate equivalent ratio) and reacted with each other at 90° C. for one hour to obtain an insulating urethane prepolymer having an NCO group at the end.

When two types of polyisocyanate (polyisocyanate raw material 1 and polyisocyanate raw material 2) were used, the ratio of the polyisocyanate raw material 1 and polyisocyanate raw material 2 mixed was selected so that the number of OH groups in the polyol and the number of NCO groups in the polyisocyanate were the same.

Next, each battery covered with the film shown in Table 1 was prepared, and the battery was connected to a protection circuit board capable of controlling a voltage and a current of the battery and, in this state, they were inserted, together with a cushioning material and a spacer, into the cavity of a mold and fixed to a predetermined position. Then, from three resin injection holes each having a hole diameter of 0.5 mm positioned in the upper portion of the mold, a material for casing containing the insulating urethane prepolymer was injected into the cavity at the temperature shown in Table 1 while applying a pressure (0.1 MPa) to the material, and, at a point in time when the excess resin was drained from three resin discharge holes positioned in the lower portion of the mold, the material for casing in the cavity was cured to form a covering material, and the excess resin remaining in the discharge holes was cut, thereby preparing a battery pack in each Example.

Examples 7 to 19

Insulating urethane prepolymers were individually obtained in the same manner as in Examples 1 to 6, except that insulating curable polyurethane resins each including the polyester polyol and polyisocyanate shown in Table 1 were respectively used. With respect to the polyester polyol, a mixture of the polyol raw material 1 (fatty acid) and polyol raw material 2 (polyol) in an 80:20 ratio (weight ratio) was used.

Battery packs in the Examples were individually obtained in the same manner as in Examples 1 to 6, except that the insulating urethane prepolymers were respectively used.

Examples 20 to 31

Insulating urethane prepolymers were individually obtained in the same manner as in Examples 1 to 6, except that insulating curable polyurethane resins each including the polyether polyol and polyisocyanate shown in Table 2 were respectively used.

With respect to the polyether polyol, a mixture of the polyol raw material 1 (alkylene oxide) and polyol raw material 2 (polyol) in an 80:20 ratio (weight ratio) was used.

In other words, with respect to the polyether polyol, there was used a mixture in a predetermined ratio such that (number of hydroxyl groups per one molecule of polyol raw material 2)/(molecular weight of polyol raw material 2)=(number of alkylene oxide functional groups per one molecule of polyol raw material 1)/(molecular weight of polyol raw material 1), that is, the hydroxyl groups and alkylene oxide balanced.

Battery packs in the Examples were individually obtained in the same manner as in Examples 1 to 6, except that the insulating urethane prepolymers were respectively used.

Comparative Examples 1 to 4

Battery packs in the Comparative Examples were individually obtained in the same manner as in Examples 1 to 6, except that the resins shown in Table 2 were respectively used as a shape-retaining polymer. In Comparative Example 3, a shape-retaining polymer including a thermoplastic acrylonitrile-butadiene-styrene (ABS) resin was used, and the shape-retaining polymer melted at 120° C. was extruded to fill the cavity with the polymer. In Comparative Example 4, a shape-retaining polymer including thermoplastic polyurethane was used, and the shape-retaining polymer melted at 110° C. was extruded to fill the cavity with the polymer.

With respect to each of the battery packs in the Examples and Comparative Examples, a temperature at which the material for casing constituting the covering material was injected into the cavity, and a curing time (a period of time from filling to releasing) of the material for casing, and a glass transition temperature (Tg) as measured by differential scanning calorimetry, a durometer D hardness as measured by the method described in JIS K7215, a flexural strength and a flexural modulus as measured by the method described in JIS K7171, a volume resistivity, and a maximum thickness on one side of the covering material are shown in Tables 1 and 2.

Measurement of Volume Resistivity (Ω·cm)

A volume resistivity was measured in accordance with JIS C2105, by a method in which a measurement voltage of 500 V is applied to a sample (area: 50 mm×50 mm; thickness: 3 mm) at 25±5° C. and at 65±5% RH, and, after 60 seconds, the volume resistivity is measured by means of an insulation resistance tester (SM-8220; manufactured and sold by HIOKI E. E. CORPORATION).

Measurement of Hardness of Thermoplastic Resin

With respect to the thermoplastic resin used in the covering material for the battery packs in Comparative Examples 3 and 4, the hardness was measured in accordance with JIS K6253, by a method in which two pieces of samples (area: 50 mm×50 mm; thickness: 3 mm) are stacked (thickness: 6 mm) and a hardness of the stacked samples is measured by means of a hardness meter (model: WR-105D; manufactured and sold by Nishi Tokyo Seimitsu Co., Ltd.).

Further, with respect to each of the battery packs in the Examples and Comparative Examples, evaluation of battery performance was made by the following methods. The results are shown in Tables 1 and 2.

Evaluation of Battery Performance (1) Rated Energy Density (Wh/l)

At a temperature of 23° C., a cycle of IC constant current and constant voltage charging at an upper limit of 4.2 V for 15 hours and 1C constant current discharging to a final voltage of 2.5 V was repeatedly conducted, and a rated energy density was determined from a discharge capacity in the first cycle.

Rated energy density (Wh/l)=(Average discharge voltage (V)×Rated capacity (Ah))/Battery volume 1C indicates a current for enabling to discharge the theoretical capacity of a battery in one hour.

(2) Drop Test (A)

For observing variations of mechanical strength with respect to the battery packs in the Examples and Comparative Examples, ten battery packs were prepared per one Example, and all the ten battery packs were individually allowed to freely fall from a height of 2 meters to a concrete floor. The test was conducted 10 times per one battery pack so that all the six plane surfaces of the battery pack individually hit the floor. The number of battery pack(s) which had no damage was designated by OK, and the number of battery pack(s) which had a fracture or suffered removal of components was designated by NG.

(3) Drop Test (B)

With respect to each of the Examples and Comparative Examples, the battery pack was allowed to freely fall from a height of 1.2 meters to a concrete floor 50 times, and then a size change (Δt) was measured.

TABLE 1

|   | Type of filler | Content (%) | Form retaining polymer | Type of polyol | Polyol 1 | Polyol 2 | Polyisocyanate | Modification |
|---|---|---|---|---|---|---|---|---|
| Ex. 1 | Spherical $SiO_2$ | 60 | Polyurethane | Principal chain: C—C bond | — | Acrylic polyol | Aromatic polyisocyanate | — |
| Ex. 2 | Flake $SiO_2$ | 50 | Polyurethane | Principal chain: C—C bond | — | Polybutadiene polyol | Aromatic polyisocyanate | — |
| Ex. 3 | Particulate $Al_2O_3$ | 40 | Polyurethane | Principal chain: C—C bond | — | Polyisoprene polyol | Aromatic polyisocyanate | — |
| Ex. 4 | Particulate $Al_2O_3$ | 40 | Polyurethane | Principal chain: C—C bond | — | Hydrogenated polybutadiene polyol | Aromatic polyisocyanate | Carbodiimide modified |
| Ex. 5 | Particulate AlN | 40 | Polyurethane | Principal chain: C—C bond | — | Polycarbonate polyol | Aromatic polyisocyanate | Carbodiimide modified |
| Ex. 6 | Particulate $Al_2O_3$ | 40 | Polyurethane | Principal chain: C—C bond | — | PIMG (Polytetramethylene glycol) | Alicyclic polyisocyanate | Carbodiimide modified |
| Ex. 7 | None | — | Polyurethane | Polyester | Ricinolic acid | Ethylene glycol | Aliphatic polyisocyanate | — |
| Ex. 8 | None | — | Polyurethane | Polyester | Oxycaproic acid | Propylene glycol | Alicycic polyisocyanate | — |
| Ex. 9 | Flake $SiO_2$ | 40 | Polyurethane | Polyester | Oxycapric acid | Butylene glycol | Aromatic polyisocyanate | — |
| Ex. 10 | Flake $SiO_2$ | 40 | Polyurethane | Polyester | Oxyundecanoic acid | Hexamethylene glycol | Aromatic polyisocyanate | Carbodiimide modified |
| Ex. 11 | Flake $SiO_2$ | 40 | Polyurethane | Polyester | Oxylinoleic acid | Diethylene glycol | Aromatic polyisocyanate | Carbodiimide modified |
| Ex. 12 | Flake $SiO_2$ | 40 | Polyurethane | Polyester | Oxystearic acid | Glycerol | Aromatic polyisocyanate | Isocyanurate modified |
| Ex. 13 | Particulate $SiO_2$ + Fibrous AlN | 20/20 | Polyurethane | Polyester | Oxyhexanedecenoic acid; hydroxy-containing long-chain fatty acid | Trimethylolpropane | Aromatic polyisocyanate | Isocyanurate modified |
| Ex. 14 | Flake $SiO_2$ | 20 | Polyurethane | Polyester | Ricinolic acid | Triethanolamine | Aromatic polyisocyanate | Isocyanurate modified |
| Ex. 15 | Flake $SiO_2$ | 15 | Polyurethane | Polyester | Oxycaproic acid | Diglycerol | Aliphatic polyisocyanate | Isocyanurate modified |
| Ex. 16 | Flake $SiO_2$ | 10 | Polyurethane | Polyester | Oxycapric acid | Pentaerythritol | Alicyclic polyisocyanate | Isocyanurate modified |
| Ex. 17 | Flake $SiO_2$ | 40 | Polyurethane | Polyester | Oxyundecanoic acid | Sorbitol | Alicyclic polyisocyanate | Carbodiimide modified |
| Ex. 18 | Flake $SiO_2$ | 40 | Polyurethane | Polyester | Oxylinoleic acid | Maltose | Alicycic polyisocyanate | Isocyanurate modified |
| Ex. 19 | Flake $SiO_2$ | 40 | Polyurethane | Polyester | Oxystearic acid | Sucrose | Alicyclic polyisocyanate | Isocyanurate modified |

|   | Polyisocyanate 1 | Polyisocyanate 2 | Temperature upon injecting into mold cavity | Curing time (Filling to releasing) | Glass transition temperature; Tg (°C.) | Durometer hardness | Flexural strength (MPa) | Flexural modulus (MPa) |
|---|---|---|---|---|---|---|---|---|
| Ex. 1 | Diphenylmethane diisocyanate (MDI) | — | 120° C. | 20 min | 135 | D95 | 125 | 28 |

TABLE 1-continued

| | | | | | | | | |
|---|---|---|---|---|---|---|---|---|
| Ex. 2 | Polymethylene polyphenylene polyisocyanate (Crude MDI) | — | 110° C. | 10 min | 130 | D95 | 120 | 30 |
| Ex. 3 | Tolylene diisocyanate (TDI) | — | 100° C. | 15 min | 115 | D88 | 105 | 950 |
| Ex. 4 | Diphenylmethane diisocyanate (MDI) | — | 90° C. | 20 min | 112 | D85 | 100 | 950 |
| Ex. 5 | Diphenylmethane diisocyanate (MDI) | Urethane prepolymer composed of polyethylene glycol and excess diphenylmethane diisocyanate (MDI) | 85° C. | 20 min | 110 | D80 | 95 | 1,000 |
| Ex. 6 | Polymethylene polyphenylene polyisocyanate (Crude MDI) | Urethane prepolymer composed of polypropylene glycol and excess hexamethylene diisocyanate (HDI) | 80° C. | 20 min | 100 | D75 | 90 | 1,200 |
| Ex. 7 | Hexamethylene diisocyanate (HDI) | — | 90° C. | 30 min | 40 | D28 | 9 | 3,100 |
| Ex. 8 | Isophorone diisocyanate (IPDI) | — | 90° C. | 20 min | 45 | D30 | 10 | 3,000 |
| Ex. 9 | Polytolylene polyisocyanate (Crude TDI) | — | 90° C. | 20 min | 70 | D55 | 67 | 2,600 |
| Ex. 10 | Polymethylene polyphenylene polyisocyanate (Crude MDI) | — | 90° C. | 20 min | 73 | D60 | 68 | 2,550 |
| Ex. 11 | Tolylene diisocyanate (TDI) | — | 90° C. | 20 min | 75 | D65 | 69 | 2,530 |
| Ex. 12 | Polytolylene polyisocyanate (Crude TDI) | — | 90° C. | 20 min | 75 | D65 | 70 | 2,520 |
| Ex. 13 | Xylene diisocyanate (XDI) | — | 85° C. | 20 min | 75 | D65 | 75 | 2,530 |
| Ex. 14 | Naphthalene diisocyanate (NDI) | — | 80° C. | 20 min | 80 | D70 | 80 | 2,540 |
| Ex. 15 | Hexamethylene diisocyanate (HDI) | — | 75° C. | 25 min | 80 | D70 | 80 | 2,530 |
| Ex. 16 | Isophorone diisocyanate (IPDI) | — | 50° C. | 20 min | 80 | D70 | 80 | 2,550 |
| Ex. 17 | Tolylene diisocyanate (TDI) | Urethane prepolymer composed of polytetraethylene glycol and excess isophorone diisocyanate (IPDI) | 55° C. | 15 min | 100 | D80 | 100 | 2,100 |
| Ex. 18 | Polytolylene polyisocyanate (Crude TDI) | Urethane prepolymer composed of polyethylene glycol and excess diphenylmethane diisocyanate (MDI) | 50° C. | 10 min | 100 | D81 | 105 | 2,000 |
| Ex. 19 | Xylene diisocyanate (XDI) | Urethane prepolymer composed of polypropylene glycol and excess hexamethylene diisocyanate | 40° C. | 5 min | 105 | D82 | 110 | 1,900 |

TABLE 1-continued (HDI)

|  | Volume resistivity ($\Omega \cdot cm$) | Packaging member | Maximum thickness on one side ($\mu m$) | Rated E density (Wh/l) | Drop test A | Drop test B |
|---|---|---|---|---|---|---|
| Ex. 1 | $10^{10}$ | Al laminated film | 300 | 500 | 10 All OK | Fracture/1.2 |
| Ex. 2 | $10^{10}$ | Al laminated film | 200 | 515 | 10 All OK | Fracture/1.0 |
| Ex. 3 | $10^{11}$ | Al laminated film | 200 | 515 | 10 All OK | Fracture/1.0 |
| Ex. 4 | $10^{11}$ | Al laminated film | 150 | 530 | 10 All OK | 0.8 |
| Ex. 5 | $10^{12}$ | Al laminated film | 100 | 550 | 10 All OK | 0.4 |
| Ex. 6 | $10^{13}$ | Al laminated film | 90 | 550 | 10 All OK | 0.4 |
| Ex. 7 | $10^{14}$ | Al laminated film | 300 | 500 | 10 All OK | Fracture/1.2 |
| Ex. 8 | $2 \times 10^{15}$ | Al laminated film | 200 | 515 | 10 All OK | Fracture/1.0 |
| Ex. 9 | $2 \times 10^{15}$ | Al laminated film | 200 | 515 | 10 All OK | Fracture/1.0 |
| Ex. 10 | $2 \times 10^{15}$ | Al laminated film | 180 | 520 | 10 All OK | 0.8 |
| Ex. 11 | $2 \times 10^{15}$ | Al laminated film | 160 | 525 | 10 All OK | 0.8 |
| Ex. 12 | $10^{15}$ | Al laminated film | 150 | 530 | 10 All OK | 0.8 |
| Ex. 13 | $10^{16}$ | Al laminated film | 150 | 530 | 10 All OK | 0.8 |
| Ex. 14 | $10^{16}$ | Al laminated film | 150 | 530 | 10 All OK | 0.8 |
| Ex. 15 | $10^{16}$ | Al laminated film | 150 | 530 | 10 All OK | 0.7 |
| Ex. 16 | $10^{16}$ | Al laminated film | 150 | 530 | 10 All OK | 0.7 |
| Ex. 17 | $10^{16}$ | Al laminated film | 100 | 550 | 10 All OK | 0.4 |
| Ex. 18 | $10^{16}$ | Al laminated film | 100 | 550 | 10 All OK | 0.4 |
| Ex. 19 | $10^{16}$ | Al laminated film | 100 | 550 | 10 All OK | 0.4 |

TABLE 2

|  | Type of filler | Content (%) | Form retaining polymer | Type of polyol | Polyol 1 | Polyol 2 | Polyisocyanate | Modification | Polyisocyanate 1 | Polyisocyanate 2 |
|---|---|---|---|---|---|---|---|---|---|---|
| Ex. 20 | None | — | Polyurethane | Polyether | Ethylene oxide | Ethylene glycol | Aromatic polyisocyanate | — | Xylene diisocyanate (XDI) | — |

TABLE 2-continued

| | | | | | | | | | | |
|---|---|---|---|---|---|---|---|---|---|---|
| Ex. 21 | None | — | Poly-urethane | Polyether | Propylene oxide | Diethylene glycol | Aromatic polyiso-cyanate | — | Naphthalene diisocyanate (NDI) | — |
| Ex. 22 | None | — | Poly-urethane | Polyether | Butylene oxide | Propylene glycol | Aromatic polyiso-cyanate | — | Urethane prepolymer composed of polyethylene glycol and excess diphenylmethane diisocyanate (MDI) | — |
| Ex. 23 | None | — | Poly-urethane | Polyether | α-Olefin oxide | Dipropylene glycol | Aliphatic polyiso-cyanate | — | Urethane prepolymer composed of polypropylene glycol and excess hexamethylene diisocyanate (HDI) | — |
| Ex. 24 | None | — | Poly-urethane | Polyether | Ethylene oxide | 1,3-Butanediol | Alicycic polyiso-cyanate | — | Urethane prepolymer composed of polytetraethylene glycol and excess isophorone diisocyanate (IPDI) | — |
| Ex. 25 | Particulate $Si_3N_4$ | 20 | Poly-urethane | Polyether | Propylene oxide | 1,4-Butanediol | Alicycic polyiso-cyanate | Isocyanurate modified | Naphthalene diisocyanate (NDI) | Urethane prepolymer composed of polytetraethylene glycol and excess isophorone diisocyanate (IPDI) |
| Ex. 26 | Particulate $SiO_2$ + Fibrous $Si_3N_4$ | 20/20 | Poly-urethane | Polyether | Butylene oxide | 4,4'-Dihydroxy-phenyl-propane | Alicycic polyiso-cyanate | Isocyanurate modified | Hexamethylene diisocyanate (HDI) | Urethane prepolymer composed of polyethylene glycol and excess diphenylmethane diisocyanate (MDI) |
| Ex. 27 | Particulate $SiO_2$ + Fibrous $Si_3N_4$ | 20/20 | Poly-urethane | Polyether | α-Olefin oxide | 4,4'-Dihydroxy-phenyl-methane | Alicycic polyiso-cyanate | Isocyanurate modified | Isophorone diisocyanate (IPDI) | Urethane prepolymer composed of polypropylene glycol and excess hexamethylene diisocyanate (HDI) |
| Ex. 28 | Particulate $SiO_2$ + Fibrous $Si_3N_4$ | 20/20 | Poly-urethane | Polyether | Ethylene oxide | Glycerol | Alicycic polyiso-cyanate | Isocyanurate modified | Isophorone diisocyanate (IPDI) | Urethane prepolymer composed of polytetraethylene glycol and excess isophorone diisocyanate (IPDI) |
| Ex. 29 | Particulate $SiO_2$ + Fibrous $Si_3N_4$ | 20/20 | Poly-urethane | Polyether | Propylene oxide | 1,1,1-Trimethyl-olpropane | Alicycic polyiso-cyanate | Isocyanurate modified | Isophorone diisocyanate (IPDI) | Urethane prepolymer composed of polyethylene glycol and excess diphenylmethane diisocyanate (MDI) |
| Ex. 30 | Zeolite | 40 | Poly-urethane | Polyether | Butylene oxide | 1,2,5-Hexanetriol | Alicycic polyiso-cyanate | Isocyanurate modified | Isophorone diisocyanate (IPDI) | Urethane prepolymer composed of polypropylene glycol and excess hexamethylene diisocyanate (HDI) |
| Ex. 31 | Zeolite | 20 | Poly-urethane | Polyether | α-Olefin oxide | Penta-erythritol | Alicycic polyiso-cyanate | Isocyanurate modified | Isophorone diisocyanate (IPDI) | Urethane prepolymer composed of polytetraethylene glycol and excess |

TABLE 2-continued

|  |  |  | | | | | | | | | isophorone diisocyanate (IPDI) |
|---|---|---|---|---|---|---|---|---|---|---|---|
| Comp. Ex. 1 | None | — | Acryl | — | — | — | — | — | — | — | — |
| Comp. Ex. 2 | None | — | Eopoxy | — | — | — | — | — | — | — | — |
| Comp. Ex. 3 | None | — | ABS | — | — | — | — | — | — | — | — |
| Comp. Ex. 4 | None | — | Poly-urethane | — | — | — | — | — | — | — | — |

|  | Temperature upon injecting into mold cavity | Curing time (Filling to releasing) | Glass transition temperature; Tg (° C.) | Durometer hardness | Flexural strength (MPa) | Flexural modulus (MPa) | Volume resistivity ($\Omega \cdot cm$) | Packaging member | Maximum thickness on one side (μm) | Rated E density (Wh/l) | Drop test A | Drop test B |
|---|---|---|---|---|---|---|---|---|---|---|---|---|
| Ex. 20 | 40° C. | 5 min | 65 | D52 | 20 | 2,600 | $10^{16}$ | Al laminated film | 200 | 515 | 10 All OK | Fracture/1.0 |
| Ex. 21 | 40° C. | 5 min | 73 | D58 | 68 | 2,550 | $10^{16}$ | Al laminated film | 200 | 515 | 10 All OK | Fracture/1.0 |
| Ex. 22 | 35° C. | 3 min | 77 | D65 | 69 | 2,400 | $10^{16}$ | Al laminated film | 150 | 530 | 10 All OK | 0.8 |
| Ex. 23 | 35° C. | 3 min | 85 | D70 | 67 | 2,400 | $10^{16}$ | Al laminated film | 150 | 530 | 10 All OK | 0.7 |
| Ex. 24 | 30° C. | 2 min | 90 | D75 | 66 | 2,400 | $10^{16}$ | Al laminated film | 150 | 530 | 10 All OK | 0.7 |
| Ex. 25 | 30° C. | 2 min | 100 | D80 | 100 | 2,100 | $10^{16}$ | Al laminated film | 100 | 550 | 10 All OK | 0.4 |
| Ex. 26 | 30° C. | 2 min | 102 | D81 | 105 | 2,000 | $10^{16}$ | Al laminated film | 100 | 550 | 10 All OK | 0.4 |
| Ex. 27 | 30° C. | 2 min | 105 | D82 | 105 | 1,900 | $10^{16}$ | Al laminated film | 100 | 550 | 10 All OK | 0.3 |
| Ex. 28 | 30° C. | 2 min | 106 | D83 | 105 | 1,900 | $10^{16}$ | Al laminated film | 100 | 550 | 10 All OK | 0.3 |
| Ex. 29 | 30° C. | 2 min | 107 | D84 | 105 | 1,900 | $10^{16}$ | Al laminated film | 100 | 550 | 10 All OK | 0.3 |
| Ex. 30 | 30° C. | 2 min | 110 | D85 | 105 | 1,900 | $10^{16}$ | (Polyethylene film + PET film) two layer | 80 | 570 | 10 All OK | 0.2 |
| Ex. 31 | 30° C. | 2 min | 110 | D85 | 105 | 1,900 | $10^{16}$ | Polyethylene film single layer | 60 | 590 | 10 All OK | 0.2 |
| Comp. Ex. 1 | Stand at room temperature | One day | −20 | D12 | 8 | 290 | $10^{14}$ | Al laminated film | 400 | 450 | 10 NG | Fracture/2.4 |
| Comp. Ex. 2 | Stand at room temperature | One day | 150 | D96 | 130 | 3,010 | $10^{15}$ | Al laminated film | 400 | 460 | 10 NG | Fracture/2.4 |
| Comp. Ex. 3 | Extrusion of resin melted at 120° C. | 5 sec | 120 | D85 | 85 | 1,700 | $10^{10}$ | Al laminated film | 400 | No battery capacity | 10 All OK | 2.1 |
| Comp. Ex. 4 | Extrusion of resin melted at 110° C. | 5 sec | 110 | D90 | 20 | 700 | $10^{10}$ | Al laminated film | 400 | No battery capacity | 10 All OK | 2.2 |

In the battery packs in Examples 1 to 31 shown in Tables 1 and 2, by using the insulating curable polyurethane resin including polyol and polyisocyanate as a shape-retaining polymer constituting the covering material, the battery and the protection circuit board can be collectively covered with the covering material at a relatively low temperature (e.g., at 120° C. or lower) and hence the battery and the protection circuit board suffer no damage, and thus there can be produced a battery pack which is advantageous not only in that it has both a high dimensional accuracy and a high mechanical strength, but also in that it has reduced size and weight such that the thickness is 300 μm or less. In Examples 1 to 31, the curing temperature of the covering material is 120° C. or lower, and therefore, while avoiding heat damage of the battery, there can be produced a battery pack having improved production efficiency, e.g., having a curing time as short as 30 minutes or less. Further, the battery packs in Examples 1 to 31 individually had a battery capacity as high as 500 (Wh/l) or more.

In contrast, it has been confirmed, from the results of the drop test, that the battery packs in Comparative Examples 1 and 2 individually have a prolonged curing time and low mechanical strength. The battery packs in Comparative Examples 3 and 4 individually had no battery capacity.

Examples 32 to 44

Insulating curable polyurethane resins each including the polyol and polyisocyanate shown in Table 3 were respectively used. The polyol and polyisocyanate were reacted in the same ratio as that in Examples 1 to 31 to obtain an insulating urethane prepolymer having an NCO group at the end. Battery packs in the Examples were individually obtained in the same manner as in Examples 1 to 31, except that the insulating urethane prepolymers were respectively used.

An oxygen content and an iodine value of the polyol were measured by the above-mentioned method, and the results are shown in Table 3. With respect to each of the battery packs in the Examples, a temperature at which the material for casing constituting the covering material was injected into the cavity, and a curing time (a period of time from filling to releasing) of the material for casing, a volume resistivity and a maximum thickness on one side of the covering material, and the evaluation of battery performance are shown in Table 3.

TABLE 3

| | Type of filler | Content (%) | Form retaining polymer | Type of polyol | Polyol 1 | Polyol 2 | Polyisocyanate | Modification | Polyisocyanate 1 |
|---|---|---|---|---|---|---|---|---|---|
| Ex. 32 | Spherical SiO$_2$ | 60 | Polyurethane | Principal chain: C—C bond | — | Acrylic polyol | Aromatic polyisocyanate | — | Diphenylmethane diisocyanate (MDI) |
| Ex. 33 | Flake SiO$_2$ | 50 | Polyurethane | Principal chain: C—C bond | — | Polybutadiene polyol | Aromatic polyisocyanate | — | Polymethylene polyphenylene polyisocyanate (Crude MDI) |
| Ex. 34 | Particulate Al$_2$O$_3$ | 40 | Polyurethane | Principal chain: C—C bond | — | Hydrogenated polybutadiene polyol | Aromatic polyisocyanate | Carbodiimide modified | Diphenylmethane diisocyanate (MDI) |
| Ex. 35 | Particulate Al$_2$O$_3$ | 40 | Polyurethane | Principal chain: C—C bond | — | Polycarbonate polyol | Aromatic polyisocyanate | Carbodiimide modified | Diphenylmethane diisocyanate (MDI) |
| Ex. 36 | Particulate AlN | 40 | Polyurethane | Polyester | Ricinolic acid | Ethylene glycol | Aliphatic polyisocyanate | — | Hexamethylene diisocyanate (HDI) |
| Ex. 37 | None | — | Polyurethane | Polyester | Oxycaproic acid | Propylene glycol | Alicycic polyisocyanate | — | Isophorone diisocyanate (IPDI) |
| Ex. 38 | Flake SiO$_2$ | 40 | Polyurethane | Polyester | Oxyundecanoic acid | Hexamethylene glycol | Aromatic polyisocyanate | Carbodiimide modified | Polymethylene polyphenylene polyisocyanate (Crude MDI) |
| Ex. 39 | Particulate SiO$_2$ + Fibrous AlN | 20/20 | Polyurethane | Polyester | Oxyundecanoic acid | Sorbital | Alicycic polyisocyanate | Carbodiimide modified | Tolylene diisocyanate (TDI) |
| Ex. 40 | Particulate Si$_3$N$_4$ | 20 | Polyurethane | Polyether | Ethylene oxide | Ethylene glycol | Aromatic polyisocyanate | — | Xylene diisocyanate (XDI) |
| Ex. 41 | Particulate SiO$_2$ + Fibrous Si$_3$N$_4$ | 20/20 | Polyurethane | Polyether | Butylene oxide | Propylene glycol | Aromatic polyisocyanate | — | Urethane prepolymer composed of polyethylene glycol and excess diphenylmethane diisocyanate (MDI) |
| Ex. 42 | Particulate AlN | 40 | Polyurethane | Polyether | Propylene oxide | 1,4-Butanediol | Alicycic polyisocyanate | Isocyanurate modified | Naphthalene diisocyanate (NDI) |
| Ex. 43 | Zeolite | 40 | Polyurethane | Polyether | Butylene oxide | 1,2,5-Hexanetriol | Alicycic polyisocyanate | Isocyanurate modified | Isophorone diisocyanate (IPDI) |
| Ex. 44 | Zeolite | 20 | Polyurethane | Polyether | α-Olefin oxide | Pentaerythritol | Alicycic polyisocyanate | Isocyanurate modified | Isophorone diisocyanate (IPDI) |

TABLE 3-continued

| | Polyisocyanate 2 | Temperature upon injecting into mold cavity | Curing time (Filling to releasing) | Oxygen content of polyol (%) | Iodine value | Volume resistivity ($\Omega \cdot cm$) | Packaging member | Maximum thickness on one side ($\mu m$) | Rated E density (Wh/l) | Drop test A | Drop test B |
|---|---|---|---|---|---|---|---|---|---|---|---|
| Ex. 32 | — | 120° C. | 20 min | 31 | 200 | $10^{10}$ | Al laminated film | 300 | 500 | 10 All OK | Fracture/1.2 |
| Ex. 33 | — | 110° C. | 10 min | 30 | 190 | $10^{11}$ | Al laminated film | 200 | 515 | 10 All OK | Fracture/1.0 |
| Ex. 34 | — | 92° C. | 20 min | 22 | 150 | $10^{12}$ | Al laminated film | 150 | 530 | 10 All OK | 0.8 |
| Ex. 35 | Urethane prepolymer composed of polyethylene glycol and excess diphenylmethane diisocyanate (MDI) | 90° C. | 20 min | 20 | 140 | $10^{13}$ | Al laminated film | 100 | 550 | 10 All OK | 0.4 |
| Ex. 36 | — | 92° C. | 30 min | 30 | 205 | $10^{14}$ | Al laminated film | 300 | 500 | 10 All OK | Fracture/1.2 |
| Ex. 37 | — | 92° C. | 20 min | 25 | 180 | $2 \times 10^{15}$ | Al laminated film | 200 | 515 | 10 All OK | Fracture/1.0 |
| Ex. 38 | — | 92° C. | 20 min | 22 | 140 | $10^{15}$ | Al laminated film | 180 | 520 | 10 All OK | 0.8 |
| Ex. 39 | Urethane prepolymer composed of polytetraethylene glycol and excess isophorone diisocyanate (IPDI) | 90° C. | 15 min | 15 | 120 | $10^{16}$ | Al laminated film | 100 | 550 | 10 All OK | 0.4 |
| Ex. 40 | — | 40° C. | 5 min | 27 | 186 | $10^{16}$ | Al laminated film | 200 | 515 | 10 All OK | Fracture/1.0 |
| Ex. 41 | — | 35° C. | 3 min | 22 | 145 | $10^{16}$ | Al laminated film | 150 | 530 | 10 All OK | 0.8 |
| Ex. 42 | Urethane prepolymer composed of polytetraethylene glycol and excess isophorone diisocyanate (IPDI) | 30° C. | 2 min | 19 | 130 | $10^{16}$ | Al laminated film | 100 | 550 | 10 All OK | 0.4 |
| Ex. 43 | Urethane prepolymer composed of polypropylene glycol and excess hexamethylene diisocyanate (HDI) | 30° C. | 2 min | 15 | 110 | $10^{16}$ | (Polyethylene film + PET film) two layer | 80 | 570 | 10 All OK | 0.2 |
| Ex. 44 | Urethane prepolymer composed of polytetraethylene glycol and excess isophorone diisocyanate (IPDI) | 30° C. | 2 min | 11 | 95 | $10^{16}$ | Polyethylene film single layer | 60 | 590 | 10 All OK | 0.2 |

In the battery packs in Examples 32 to 44 shown in Table 3, the polyol contained in the covering material has an oxygen content and an iodine value which are respectively in preferred ranges, and thus there can be produced a battery pack which is advantageous not only in that it has both high dimensional accuracy and high mechanical strength, but also in that it has reduced size and weight such that the thickness is 300 µm or less. In Examples 32 to 44, while avoiding heat damage of the battery, a battery pack having improved production efficiency can be produced. Further, the battery packs in Examples 32 to 44 individually had a battery capacity as high as 500 (Wh/l) or more.

According to an embodiment by virtue of the above-described construction, there can be provided a battery pack which is advantageous not only in that the battery pack has both high dimensional accuracy and high mechanical strength, but also in that the battery pack has reduced size and weight, and a method for producing the same.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising:
a battery including a battery element covered with a packaging member, the battery element including a positive electrode and a negative electrode which are spirally wound together or stacked on one another through a separator;
a protection circuit board for the battery; and
a covering material collectively covering the battery and the protection circuit board,
wherein the covering material includes a shape-retaining polymer comprising an insulating curable polyurethane resin, and
wherein the insulating curable polyurethane resin comprises a polyol and a polyisocyanate.

2. The battery pack according to claim 1, wherein the polyol has an oxygen content of 30% by mass or less.

3. The battery pack according to claim 1, wherein the polyol has an iodine value of 200 or less.

4. The battery pack according to claim 1, wherein the polyol is at least one member selected from the group consisting of polyester polyol, polyether polyol, and polyol having a principal chain composed of a carbon-carbon bond.

5. The battery pack according to claim 4, wherein the polyester polyol is composed of a reaction product of a fatty acid and polyol,
wherein the fatty acid is at least one long-chain fatty acid having a hydroxyl group selected from the group consisting of ricinolic acid, oxycaproic acid, oxycapric acid, oxyundecanoic acid, oxylinoleic acid, oxystearic acid, and oxyhexanedecenoic acid, and
wherein the polyol is at least one member selected from the group consisting of ethylene glycol, propylene glycol, butylene glycol, hexamethylene glycol, diethylene glycol, trifunctional polyol including glycerol, trimethylolpropane, or triethanolamine, tetrafunctional polyol including diglycerol or pentaerythritol, hexafunctional polyol including sorbitol, and octafunctional polyol including maltose or sucrose.

6. The battery pack according to claim 4, wherein the polyether polyol is composed of an addition polymerization product of an alcohol and alkylene oxide,
wherein the alcohol is at least one member selected from the group consisting of ethylene glycol, diethylene glycol, propylene glycol, dipropylene glycol, dihydric alcohol including 1,3-butanediol, 1,4-butanediol, 4,4'-dihydroxyphenylpropane, or 4,4'-dihydroxyphenylmethane, and trihydric or polyhydric alcohol including glycerol, 1,1,1-trimethylolpropane, 1,2,5-hexanetriol, or pentaerythritol, and
wherein the alkylene oxide is at least one member selected from the group consisting of ethylene oxide, propylene oxide, butylene oxide, and α-olefin oxide.

7. The battery pack according to claim 4, wherein the polyol having a principal chain composed of a carbon-carbon bond is at least one member selected from the group consisting of acrylic polyol, polybutadiene polyol, polyisoprene polyol, hydrogenated polybutadiene polyol, polycarbonate polyol, and polytetramethylene glycol (PTMG).

8. The battery pack according to claim 1, wherein the polyisocyanate is selected from the group consisting of an aromatic polyisocyanate, an aliphatic polyisocyanate, an alicyclic polyisocyanate and a mixture thereof.

9. The battery pack according to claim 8, wherein the aromatic polyisocyanate is at least one member selected from the group consisting of diphenylmethane diisocyanate (MDI), polymethylene polyphenylene polyisocyanate (crude MDI), tolylene diisocyanate (TDI), polytolylene polyisocyanate (crude TDI), xylene diisocyanate (XDI), and naphthalene diisocyanate (NDI).

10. The battery pack according to claim 8, wherein the aliphatic polyisocyanate is hexamethylene diisocyanate (HDI).

11. The battery pack according to claim 8, wherein the alicyclic polyisocyanate is isophorone diisocyanate (IPDI).

12. The battery pack according to claim 1, wherein the covering material is a composite material including the shape-retaining polymer and a filler material.

13. The battery pack according to claim 1, wherein the covering material has a glass transition temperature (Tg) of 45 to 130° C. as measured by differential scanning calorimetry (DSC).

14. The battery pack according to claim 1, wherein the covering material has a flexural strength of 10 to 120 MPa and a flexural modulus of 30 to 3,000 MPa, as measured by a flexural property test method for plastic descried in JIS K7171.

15. The battery pack according to claim 1, wherein the covering material has a surface hardness of D30 to D99 as measured by a durometer hardness test method for plastic descried in JIS K7215.

16. The battery pack according to claim 1, wherein the packaging member for covering the battery element is an aluminum laminated film.

17. The battery pack according to claim 1, wherein the packaging member for covering the battery element is a film composed of a single layer or two or more layers and includes a polyolefin film.

18. A battery pack comprising:
a battery including a battery element covered with a packaging member, the battery element including a positive electrode and a negative electrode which are spirally wound together or stacked on one another through a separator;
a protection circuit board for the battery; and
a covering material collectively covering the battery and the protection circuit board,
wherein the covering material includes a shape-retaining polymer comprising an insulating curable polyurethane resin, and
wherein the insulating curable polyurethane resin comprises a polyol and a polyisocyanate selected from the group consisting of: carbodiimide-modified polyisocyanate obtained by modifying the polyisocyanate with carbodiimide, isocyanurate-modified polyisocyanate obtained by modifying the polyisocyanate with isocyanurate, and an urethane polymer having an isocyanate group at the end of molecule, which is a reaction product of polyol and the excess polyisocyanate.

19. The battery pack according to claim 12, wherein the filler material is selected from the group consisting of a ceramic filler, a metal oxide filler and a metal nitride filler.

* * * * *